May 13, 1930.  R. G. TUGENDHAT  1,757,983
ELECTRICALLY HEATED BAKING MACHINE.
Original Filed Dec. 18, 1923  3 Sheets-Sheet 1
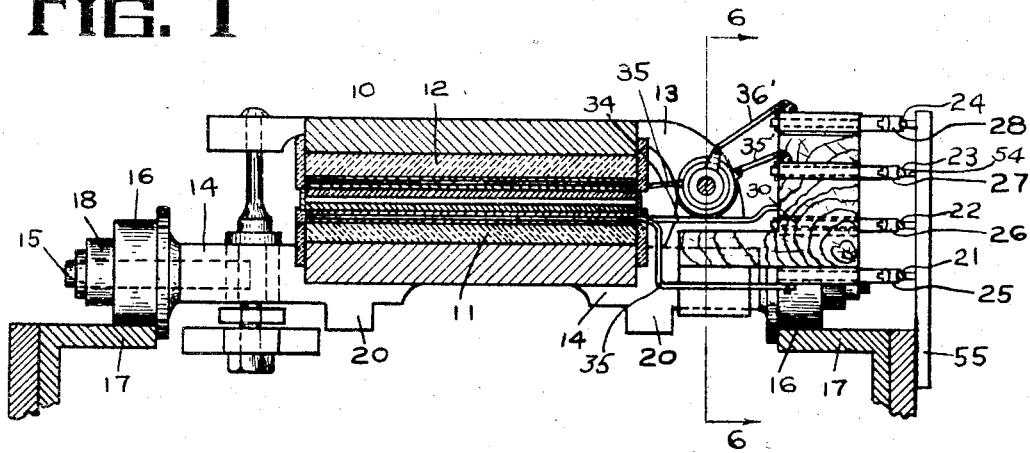
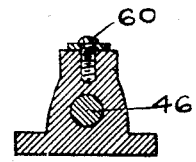
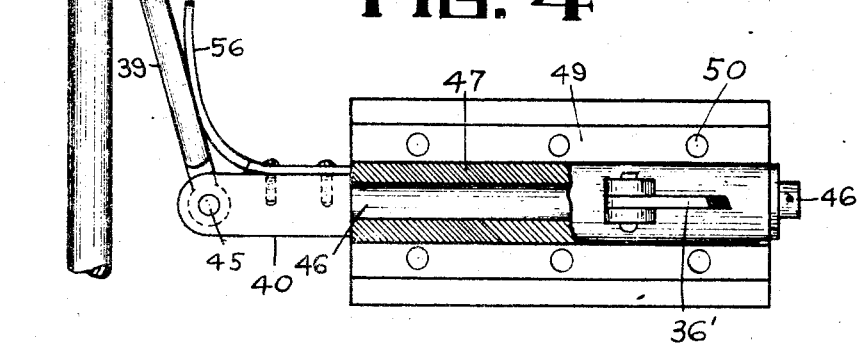
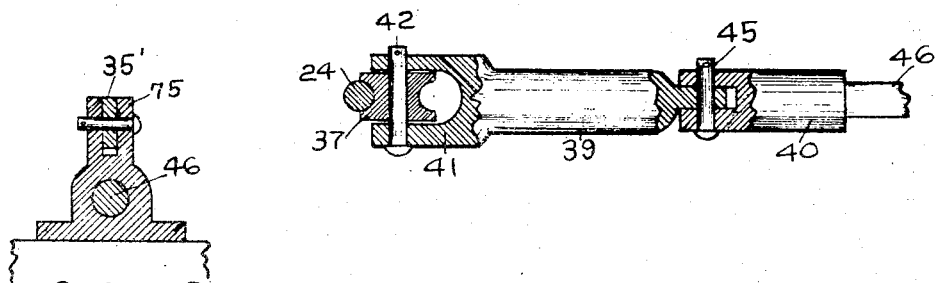
INVENTOR
R. GEORGE TUGENDHAT
BY
*Newell R Spencer*
ATTORNEYS

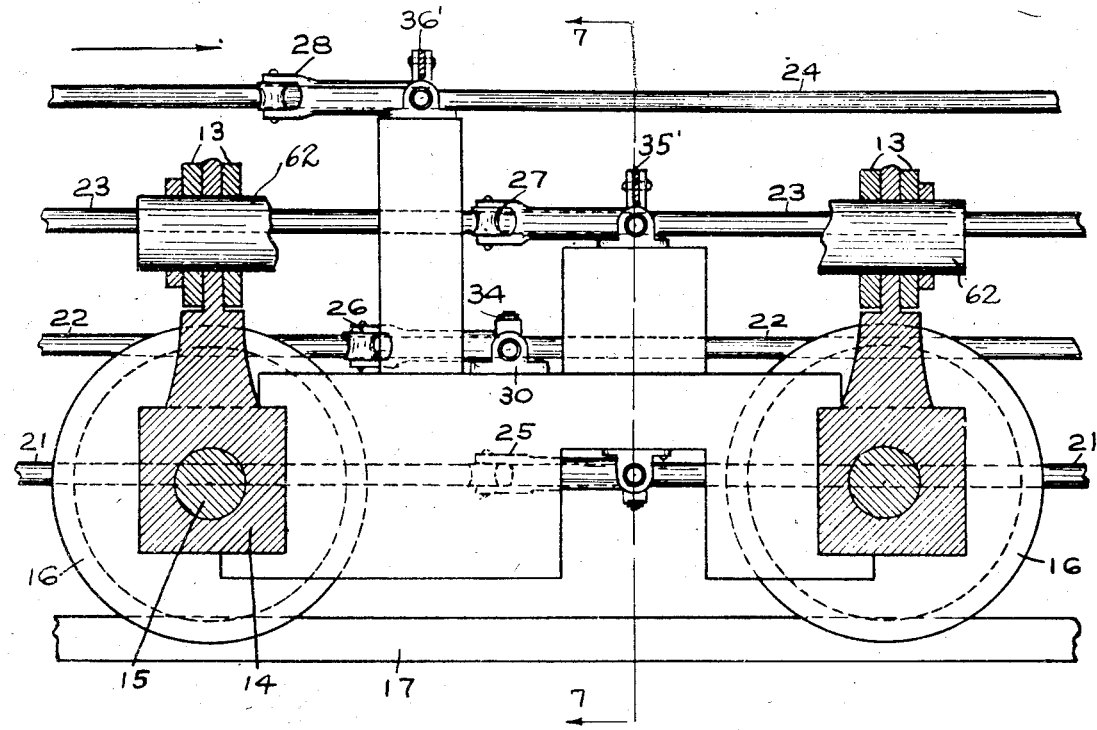

May 13, 1930.  R. G. TUGENDHAT  1,757,983
ELECTRICALLY HEATED BAKING MACHINE
Original Filed Dec. 18, 1923  3 Sheets-Sheet 2
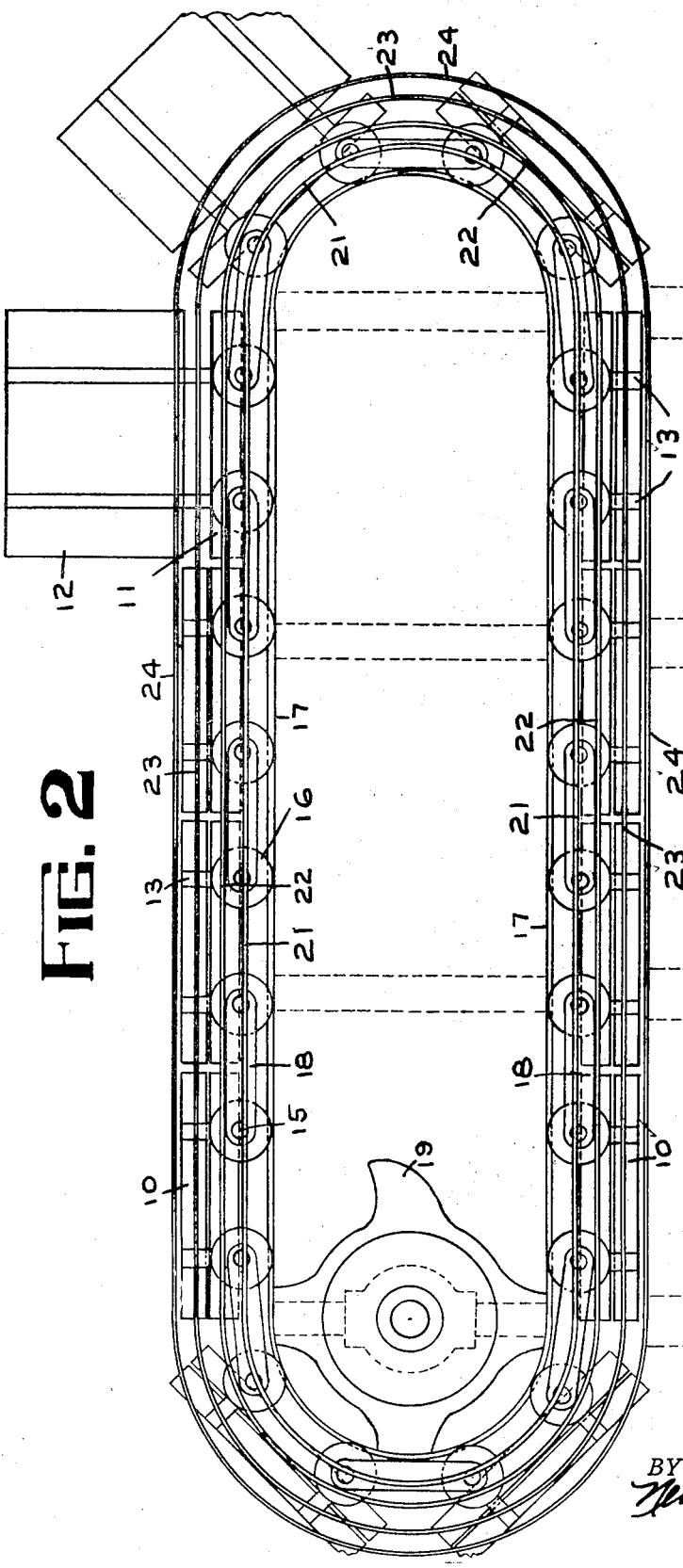
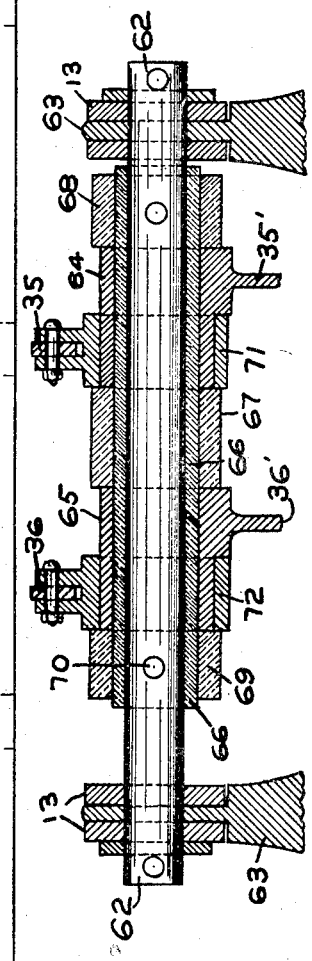
INVENTOR
R. GEORGE TUGENDHAT
BY Newell & Spencer,
ATTORNEYS.

Patented May 13, 1930

1,757,983

UNITED STATES PATENT OFFICE

ROBERT GEORGE TUGENDHAT, OF BRUNN, CZECHOSLOVAKIA, ASSIGNOR TO BAKER PERKINS COMPANY, OF SAGINAW, MICHIGAN, A CORPORATION OF NEW YORK

ELECTRICALLY-HEATED BAKING MACHINE

Original application filed December 18, 1923, Serial No. 681,329. Divided and this application filed October 22, 1926. Serial No. 143,529.

This invention relates to baking apparatus, and more particularly to electrically heated baking machines. The invention is illustrated in this application as embodied in a baking machine, especially designed for use in the production of wafers and similar articles. Articles of this character are extensively manufactured in what is known in the art as "automatic baking machines." Such machines comprise a series of baking pans arranged to travel along a track, and arranged to receive the material to be baked at one point in their travel and to discharge the baked material at another point. Such machines are provided with suitable heating mechanism for heating the pans during their travel from the loading point to the point of discharge, so as to bake the material during this period, and certain machines have embodied electrical heating mechanism.

One of the principal objects of the present invention is to improve the construction and mode of operation of electrically heated baking machines of the travelling pan type and to provide such machines with improved mechanism for heating the pans.

Another object of the invention is to provide machines of this class with novel and improved electrical connections for supplying current to heaters of the movable parts of the baking pans, uniformly and without interruption, regardless of the position or movement of these parts of the pans.

With these and other objects in view, the invention comprises the novel and improved features, construction and combination of parts hereinafter described, and particularly pointed out in the claims, the advantages of which will be clearly understood and appreciated by those skilled in the art.

This application is a divisional application based upon certain subject-matter contained in my prior application, Serial No. 681,329, filed December 18, 1923.

The invention will be clearly understood from the accompanying drawings illustrating the invention in its preferred form, and the following detailed description of the construction therein shown.

In the drawings:

Figure 1 is a transverse sectional view showing a section of track, a baking pan in section and its manner of support on the track, the electricity conductors, and the collecting means by which the electric current is transferred from the electricity conductors to the baking pans;

Figure 2 is a view in side elevation of the baking machine showing the baking pans, the track about which they travel, and the electricity conductors, other parts of the machine being shown diagrammatically or omitted;

Figure 3 is a detail sectional view taken through the axis of the hinge of the cover of one of the baking pans, and illustrating the manner in which the electric current is conducted to the heaters of the pan covers regardless of the position of said covers;

Figure 4 is a plan view on an enlarged scale of one of the electric current collecting devices, a portion of said view being in section;

Figure 5 is a detail view in elevation and partly in section of one of the collecting devices;

Figure 6 is an enlarged vertical sectional view taken on the line 6—6 of Figure 1 with parts of the cover hinge pin broken away to show more clearly the supports and mountings of the collecting devices;

Figure 7 is a vertical sectional view taken on the line 7—7 of Figure 6 but showing a modified form of electrical connecting means between the baking pans and the collecting devices;

Figures 8 and 9 are detail sectional views taken on the lines 8—8 and 9—9 respectively of Figure 7, and showing two types of mountings for the electric current collecting devices.

The machine illustrated in the drawings of this application is an automatic wafer baking machine made up of a train of wheeled baking pans arranged to run along suitable tracks preferably consisting of two superimposed straight portions connected by two curved portions. The machine comprises a plurality of baking pans 10 which are suitably connected together, preferably at opposite ends thereof, by links 18. These connected pans are moved around endless tracks 17 by means of suitably driven sprockets 19 which engage lugs 20 on the baking pans. The pans are supported on the track by rollers 16 mounted upon axles or stub shafts 15 which, in turn, are suitably mounted in cross-bars 14 extending transversely of the under sides of the pans.

Each of the pans 10 preferably comprises a body portion or base 11 in which the batter to be baked is carried, and a cover 12 for the body portion. The cover 12 is mounted to the body portion to permit the cover to swing to open and closed positions in respect to the body portion.

In the illustrated construction, brackets extending rearwardly from the cover 12 of each of the pans terminate in hinge ears 13 adapted to co-operate with similar ears on the upright posts 63 extending from the crossbars 14. These ears are pivotally connected by a hinge pin 62 held in place longitudinally by washers and pins as shown.

In baking apparatus of the type disclosed, the time required to bake each batch of batter is very short so that the covers of the baking pans are opened and closed frequently. In the present construction, both the cover and the base of the pan are provided with electrical heaters. Even highly flexible conductors, carrying current to the cover heaters, would soon wear out with this service and I have, therefore, provided hinges in the cover conductors to permit movement of the cover without wear on the conductors. I prefer to mount these conductor hinges on the pin 62 to which the cover, as a whole, is pivoted, first placing an insulating sleeve 66 over the pin when the pin is made of conducting material. On the sleeve 66, I mount conducting cylinders 65 and 64, which I separate by an insulating spacer 67, and retain against longitudinal movement by insulating rings 68 and 69 and pins 70, as shown in Figure 3. Sleeve contacts 72 and 71 are journalled on the conducing cylinders 65 and 64 respectively. Movement of sleeve 72, axially of the cylinder 65, is limited by its abutment against the adjacent ring 69 and a lug or shoulder on the conducting cylinder 65, while the spacer 67 and a lug on the conducting cylinder 64 perform the same function for the sleeve 71. Conducting straps 36 and 35, pivotally connected respectively with the sleeve contacts 72 and 71, connect said contacts respectively to opposite ends of the cover heater element.

I obtain the heating current from bus or trolley wires 21, 22, 23 and 24 which extend one above the other substantially parallel to the track on which the train of pans circulates and at one side thereof, preferably on the side of the pans adjacent to that on which the hinges connecting the bases with the covers are located. These trolley wires are supported upon uprights 55 by means of suitable insulators 54 and receive the electrical current from any suitable source of supply (not shown). These conductors may be connected through independent switching mechanism to the same or to different sources of power. By connecting the cover heaters with one pair of trolley wires, and the base heaters with another pair of wires, I may thus control the heating of either part of each pan independently of the other, either by changing the voltage impressed on the feed wires or by opening one circuit entirely. To compensate for irregularities in the track and bus wires, and to provide for continuous connection between the heaters and the wires, even on curved portions of the track, I employ spring pressed trolleys 25, 26, 27 and 28 to carry current from the wires to the baking pans. The trolleys may conveniently be mounted at the levels of their respective trolley wires in bearing supports 47, fixed to an insulating block 30, carried between the rear brackets of the pan carriage. As shown in Figures 4 and 5, each trolley consists of two hinged conducting arms 39 and 40. A trolley wheel 37, grooved to fit a trolley wire, is rotatably mounted on a pin 42 which is secured between the bifurcated ends 41 of the trolley arm 39. This arm 39 is preferably of rectangular cross-section and is hinged as by pin 45 to the end portion of the arm 40, also of rectangular cross-section. The pin 45 is normally located in substantially a vertical position and thus permits the arm 39 to swing horizontally. The arm 40 has an abrupt shoulder dividing its hinge portion from a cylindrical portion 46 which is journalled in the bearing supports 47 to permit vertical movement of the trolley wheel, the arm being retained in its bearing by a washer and pin as shown. The axis of rotation of each arm 40 is substantially horizontal and in substantially the same plane with the trolley wire with which said arm is electrically connected. A leaf spring 56 is secured to the arm 40 of the trolley and presses against the other arm 39 to hold the trolley wheel 37 in good conducting engagement with the trolley wire as the pan carriages are drawn or moved along the track. The bearing supports 47 for the several pan carriages are secured to the respective extensions of the insulating blocks 30 as by screws 50.

The two upper bearing supports 47, which carry the trolley engaging the wires 23 and 24, are connected to the cylindrical sleeve contacts 65 and 64 respectively which are connected to the terminals of the cover heater element in the manner previously described. The connection between the bearing supports 47 and the sleeves 65 and 64 may be by single strips 36′ and 35′ (Fig. 1) or by the articulated strips 31′ (Fig. 7) which permit some rotation of the sleeves. In either case, the strips are hinged to the bearing supports 47 between the ears 75, preferably formed integral therewith (Fig. 4).

The two lower bearing supports 47, which carry the two lower trolleys, are directly connected to the opposite ends of the pan heater element by strips 33 and 34 which may be secured to the bearing supports as by the binding screws 60 (Fig. 8).

What is claimed is:

1. Baking apparatus comprising a track, a baking pan movable along said track and having a base and a cover hinged to the base, electric heating elements for the base and cover, a plurality of electricity conductors connected to a suitable source of power and extending along the track, and means for connecting said heating elements to said conductors to heat the base and cover during movement of said pan over said track.

2. Baking apparatus comprising a track, a baking pan adapted to travel along said track and having a base and a hinged cover, electric heating elements respectively for the base and cover, two sets of conductors extending along the track and independently connectable to a source of electric current supply, two sets of collecting devices mounted on the baking pan and arranged to contact with said conductors, and connections between one set of collecting devices and the electric heating element for the cover of the baking pan, and between the other set of collecting devices and the electric heater for the base, whereby current may be supplied independently to the cover and base elements during travel of the baking pan.

3. Baking apparatus comprising a track, a plurality of baking pans movable along said track, each having a base and a hinged cover, an electric heater for the base of each of said baking pans, an electric heater for the hinged cover of each pan, means for moving said baking pans along said track, and means for supplying electric current to said electric heaters simultaneously during movement of the baking pans throughout the entire length of the track.

4. Baking apparatus comprising an endless track, a plurality of electricity conductors extending parallel with said track throughout its length, a plurality of baking pans movable along said track, and each having a base and a hinged cover for closing the pan, an electric heating element for the base of said baking pans, an electric heater for the cover of each pan, and means for establishing electrical connection between said conductors and the heaters for the covers of the baking pans, said means including the hinge of the covers.

5. Baking apparatus comprising a track, electricity conductors extending parallel therewith and throughout the length thereof, a baking pan movable along said track and having a base and a hinged cover, an electric heater for the base of said baking pan, an electric heater for the cover of said baking pan, a plurality of collecting devices mounted on said carriage and having movable contact with said electricity conductors, and means for electrically connecting said collectors to said electric heaters to supply electric current to said electric heaters during travel of the carriage along said track.

6. Baking apparatus comprising an endless track, a plurality of electricity conductors arranged parallel with said track, a plurality of baking pans movable over said track and each having a base and a hinged cover, an electric heater associated with the base of each of said baking pans, an electric heater associated with each of said hinged covers, collecting devices associated with each of said baking pans, and movable therewith, said collecting devices having contact with said electricity conductors, and means for connecting said collecting devices with said heating elements for constantly supplying electric current thereto regardless of the position of the baking pans relative to the track or the covers relative to the respective bases of the pans.

7. Baking apparatus comprising an endless track, a plurality of electricity conductors extending throughout the length of said track and parallel thereto, a plurality of connected baking pans movable along said track, each having a base and a hinged cover, a hinge pin connecting the base with the cover, an electric heating element carried by the base of each of said baking pans, an electric heating element carried by each of said hinged covers, and means for supplying electric current to each of said electric heating elements, said means comprising a plurality of conductors, a plurality of collecting devices having movable contact therewith, means for connecting the electric heater of the base of each baking pan with certain of said collecting devices, and means for connecting other of said collecting devices with the heating element of each hinged cover, said last mentioned means comprising a sleeve of insulating material surrounding the hinge pin of the hinged cover, spaced sleeves of conducting material carried by said sleeve of insulating material, a collar of conducting material rotatably mounted on each of said spaced sleeves, means for connecting said spaced sleeves to certain of the collecting devices, and means for connecting said collars to the respective terminals of the electric heater for the hinged cover.

8. Baking apparatus comprising a plurality of travelling baking pans, each having a base and a hinged cover, a hinge pin connecting the base and cover, an electric heater associated with the base of each of said baking pans, an electric heater for the cover of each of said pans, and means for supplying electric current separately to said electric heaters, said means comprising a plurality of electricity conductors extending substantially parallel with the path of travel of said baking pans, collecting devices associated with the bases of the baking pans and connected directly to the electric heaters thereof, collecting devices associated with the electric heaters for the hinged covers of said pans, and means carried by the hinge pin of each baking pan for establishing electrical connection between the latter collecting devices and the electric heater for the cover of the pan.

9. In baking apparatus, the combination with a travelling baking pan, a cover therefor, a hinge member to support the cover for movement relative to the pan, and an electric heating element movable with the cover, of contacts mounted on the hinge and electrically connected to the heater and movable with the cover, contacts mounted on the hinge so as to be independent of movement of the cover and arranged to remain in electrical contact with said cover contacts regardless of movement of the latter, conductors arranged parallel to and adjacent to the path of travel of said pan and carrying a current sufficient to suitably heat said cover, and means electrically connected to said independent contacts adapted to maintain sliding electrical contact with said conductors.

10. A baking apparatus comprising a series of travelling pans, each pan having relatively movable permanently connected parts, an electrical heater for each part of the pan, conductors extending along the path of the pans and collectors associated with each pan and movable therewith and having movable contact with the conductors for supplying current independently to said heaters.

11. A baking apparatus comprising a series of travelling pans, each pan being provided with relatively movable, permanently connected parts, said heater for each part of a pan, and means for continuously supplying curent to each of said heaters independently of the other during the travel of the pans.

12. A baking apparatus comprising a series of travelling pans, each pan being provided with relatively movable, permanently connected parts, a heater for each part of a pan, and means for continuously supplying current to each of said heaters independently during the travel of the pans and during the relative movement of the parts of the pans.

13. A baking apparatus comprising a series of travelling pans, each having relatively movable parts, a heater for each of said parts of the pans, means for continuously supplying current independently to each of said heaters during the travel of the pans.

14. A baking apparatus comprising a series of travelling pans, each having relatively movable parts, a heater for each part of a pan, and means for supplying continuously current to said heaters during the travel of the pans and during the relative movement of the parts of the pan.

15. A baking apparatus comprising a travelling pan, a heater for said pan, a conductor extending along the path of travel of said pan, means for supplying electric current to said conductors, a collector for movably engaging the conductor during the travel of the pan, said collector comprising a contact element movable in two different planes to maintain proper contact with the conductor and a connection beneath the collector and the heater.

16. A baking apparatus comprising a travelling pan, a heater for said pan, a conductor extending along the path of travel of the pan, means for supplying current to said conductor, a collector for engaging the conductor, said collector comprising a contact element pivoted to swing in two different planes to maintain proper contact with the conductor, and means for yieldingly engaging said contact element with the conductor.

17. A baking apparatus comprising a travelling pan having a movable element, an electric heater mounted on said movable element of the pan, a conductor for delivering electric current to the heater, said pan element being movable transversely with relation to the conductor, a collector attached to the pan and having a movable contact with the conductor, and means for maintaining an electric connection between the collector and the heater during the movement of said pan element.

18. A baking apparatus comprising a travelling pan having a base and a cover, one of which is movable relatively to the other, an electric heater mounted on the movable element of the pan, a conductor extending along the path of travel of the pan, a collector connected to the pan and having a movable contact with the conductor, and means for maintaining an electrical connection between the collector and the heater during the movement of said movable element of the pan.

19. A baking apparatus comprising a travelling pan provided with a base and a hinged cover, a heater for said base, a heater for the cover, conductors extending along the path of travel of the pan, collector devices connected with the pan and having a movable contact with the conductor for connecting electrically the conductors and the heaters during travelling movements of the pan, and means for maintaining an electric connection between certain of said collectors and the heater for said cover during the pivotal movements of the cover.

20. In baking apparatus, a track, a train of electrically-heated baking pans provided with hinged covers movable along said track and means for heating said pans and said covers independently.

21. Baking apparatus comprising a track, a plurality of connected baking pans movable along said track, covers hinged to each pan, electric heaters for heating said pans, a conductor for supplying electric current to said heaters and a collector carried by each pan for electrically connecting said heaters to said conductor in every position of the pans upon the track.

22. Baking apparatus comprising a track, a train of baking pans traveling on said track, electric heating elements for said pans, stationary electric conductors connected to a suitable source of electricity and extending parallel to said track at the sides of said train of pans, and means for electrically connecting said heating elements to said conductors.

23. Baking apparatus comprising a track, a train of baking pans traveling on said track, electric heating elements for said pans, electric conductors connected to a suitable source of electricity and extending one above the other along the said track at the side of said pans, and means for connecting said heating elements to said conductors.

24. Baking apparatus comprising a track, a train of baking pans traveling on said track, each pan having a base and a cover connected to each other by hinges, heating elements in the base and cover of each of said pans, a plurality of stationary electric conductors each connected to a suitable source of electricity and extending one above the other along said track at the side thereof adjacent to the hinges connecting the base and cover of said pans, and means for connecting said heating elements to said conductors.

25. A baking machine comprising an endless track having two straight flights connected by two curved ends, an endless train of baking pans, each integral with a wheeled support traveling on said track, electric elements adapted to bake the contents of said pans, endless conductors connected to a suitable source of electricity, and means adapted to lead the electricity required from said conductors to said heating elements and including contact means carried on the wheeled support of said pan.

26. Baking apparatus comprising a track, a train of baking pans, each integral with a wheeled support traveling on said track, electric elements adapted to bake the contents of said pans, main electric conductors connected to a suitable source of electricity and extending one above the other along said track at the side thereof, spring pressed contacts moving along said main conductors, insulating blocks carried by the wheeled supports of said pans, bearing blocks made of conducting material and rigidly fixed on the said insulating blocks, and flexible conductors connecting these end parts of said contacts to said heating elements.

27. In baking apparatus, an endless track, consisting of two superimposed straight portions connected by curved portions, an endless train of baking pans circulating on the said track, electric heating elements provided in the said pans to bake the contents thereof, and means to supply electricity to the said heating elements at every position of the said pans on the said track.

28. In baking apparatus, an endless track consisting of two superimposed straight portions connected by curved portions, an endless train of baking pans circulating on the said track, each pan consisting of a base and a cover therefor, heating elements provided in the base and the cover to bake the contents thereof, and means separately to supply electricity to the heating elements of the base and of the cover of each pan in such a manner that at all times during operation of the apparatus each of the said elements is supplied with electricity at any position on said track of the pan, to which it belongs.

29. In baking apparatus, an endless track, consisting of straight portions connected by curved portions, an endless train of baking pans movable on said track, one or more electric heating elements provided in said pans to bake the contents thereof, and electrical connections for supplying electricity to the said heating elements, said connections including a conductor and means electrically connected to said heaters and said conductor at every position of the said pans on the said track.

30. In baking apparatus, an endless track consisting of two superimposed straight portions connected by curved portions, an endless train of baking pans movable on the said track, each pan consisting of a base and a cover therefor, heating elements provided in the base and the cover to bake the contents thereof, and electrical connections for supplying electricity separately to the heating elements of the base and of the cover of each pan, said connections including a conductor and means electrically connected to said baking pans and said conductor at every position of the said pans on the said track.

31. Baking apparatus comprising a track having two superimposed straight portions connected by curved portions, an endless train of baking pans circulating on said track, electric heating elements provided in said pans to bake the contents thereof, stationary electricity conductors connected to a suitable source of electricity, and extending one above the other substantially parallel to said track at one side thereof, and means electrically connecting said heating elements to said conductors, and so adapted that at no time the current thus transferred to said heating elements is interrupted or weakened for any of the said pans in consequence of its position on the said track.

32. Baking apparatus comprising a track having two superimposed straight portions connected by curved portions, and endless train of baking pans circulating on said track, each pan having a base and a cover connected to each other by hinges, all these hinges being positioned at the same side of said train, electric heating elements, one in the base and one in the cover of each of said pans to bake the contents thereof, stationary electricity conductors connected to a suitable source of electricity and extending one above the other substantially parallel to said track at the side thereof adjacent to the hinges connecting the base and cover of said pans, and means connecting said elements to said conductors and so adapted that at no time the current thus transferred to said electric heating elements is interrupted or weakened for any of said pans in consequence of its position on said track.

33. A baking machine comprising an endless track having two superimposed straight portions connected by curved portions, an endless train of wheeled baking pans circulating on said track, electric heating elements provided in each of said pans to bake the contents thereof, stationary endless electricity conductors connected to a suitable source of electricity and extending one above the other at one side of said track opposite to said pans and parallel to the straight portions of said track and corresponding to the position of the said pans on the curved portions of the same, and means connecting said conductors to said heating elements in such a manner, that at no time the current thus transferred to said heating elements is interrupted or weakened for any of said pans in consequence of its position on said track.

34. A baking apparatus comprising a track, a train of baking pans, wheeled supports for each of said pans traveling on said track, electric elements provided in said pans to bake the contents thereof, stationary electricity conductors connected to a suitable source of electricity and extending one above the other substantially parallel to said track at one side thereof adjacent said pans, insulating blocks fixed on each of the said wheeled supports of said pans on one side thereof and provided with bearing supports formed of conducting material, flexible means for transferring the electric current from said conductors to said bearing supports and flexible means to transfer the current from said bearing supports to said electric elements in said pans.

35. A baking apparatus comprising a track, a train of baking pans, wheeled supports, one for each of said pans and integral therewith, electric elements provided in said pans to bake the contents thereof, stationary electricity conductors connected to a suitable source of electricity and extending one above the other substantially parallel to said track at one side thereof opposite to said pans, and means adapted to lead electricity from said conductors to said heating elements and comprising bearing supports made of conducting material and carried by said wheeled supports of said pans, spring pressed contacts running along said conductors and rotatably mounted in the said bearing supports, and flexible conductors connecting the latter with said heating elements in said pans.

36. A baking apparatus comprising a track, a train of baking pans, wheeled supports, one for each of said pans and integral therewith, electric elements provided in said pans to bake the contents thereof, stationary buswires connected to a suitable source of electricity and extending one above the other substantially parallel to said track at one side thereof opposite to said pans, insulating blocks fixed on each of the said wheeled supports, all on one side thereof, bearing supports made of conducting material, provided with longitudinal cylindrical openings and fixed on said insulating blocks so that these openings are substantially vertical to said track, trolley wheels running on said buswires, trolley holders made of conducting material, and each consisting of two arms, one arm carrying at its bifurcated end one of said trolley wheels, hinged at its other end to the reenforced end part of the second arm and being pressed against its corresponding buswire by a spring provided at this reenforced end part, and the second arm forming for the rest of its length a shaft rotatably mounted in the opening of its corresponding bearing support, and flexible conductors connecting the said bearing supports with said heating elements in said pans.

ROBERT GEORGE TUGENDHAT.